US010158762B2

(12) United States Patent
Srinivasan et al.

(10) Patent No.: US 10,158,762 B2
(45) Date of Patent: Dec. 18, 2018

(54) SYSTEMS AND METHODS FOR ACCESSING CONFERENCE CALLS

(71) Applicant: Vonage Business Inc., Atlanta, GA (US)

(72) Inventors: Sanjay Srinivasan, Gilbert, AZ (US); Antonio Hung, IV, Garnerville, NY (US); Tzahi Efrati, Hoboken, NJ (US)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 15/169,085

(22) Filed: May 31, 2016

(65) Prior Publication Data
US 2016/0277583 A1    Sep. 22, 2016

Related U.S. Application Data

(63) Continuation-in-part of application No. 14/641,599, filed on Mar. 9, 2015.

(51) Int. Cl.
*H04M 3/56* (2006.01)
*H04M 3/42* (2006.01)
*H04W 4/14* (2009.01)
*G06Q 10/10* (2012.01)

(52) U.S. Cl.
CPC .......... *H04M 3/56* (2013.01); *G06Q 10/1093* (2013.01); *H04M 3/42059* (2013.01); *H04M 3/565* (2013.01); *H04W 4/14* (2013.01); *H04M 2201/52* (2013.01); *H04M 2203/2072* (2013.01); *H04M 2203/6081* (2013.01)

(58) Field of Classification Search
USPC .................................................... 379/202.01
See application file for complete search history.

(56) References Cited

U.S. PATENT DOCUMENTS

| 6,760,423 | B1 | 7/2004 | Todd |
| 6,850,609 | B1 | 2/2005 | Schrage |
| 7,085,558 | B2 | 8/2006 | Berstis et al. |
| 7,801,283 | B2 * | 9/2010 | Harwood ............ H04M 1/6091 |
| | | | 379/88.03 |
| 8,600,027 | B1 | 12/2013 | Doerr et al. |

(Continued)

FOREIGN PATENT DOCUMENTS

WO    WO 01/35655 A2    5/2001

OTHER PUBLICATIONS

Jun. 16, 2016 International Search Report issued in International Application No. PCT/US2016/020576.

(Continued)

*Primary Examiner* — Amal Zenati
(74) *Attorney, Agent, or Firm* — FisherBroyles, LLP; Joseph Pagnotta

(57) ABSTRACT

Systems and methods notify an individual when the start time of a scheduled conference call is approaching. The systems and methods may also automatically connect the individual to the conference call. The systems and methods may obtain information about one or more scheduled conference calls directly from the individual's electronic calendar. The systems and methods may also receive a request from an individual to be connected to a conference call, and then act to automatically connect the individual to the conference call using information obtained from the individual's electronic calendar.

17 Claims, 14 Drawing Sheets

(56) References Cited

U.S. PATENT DOCUMENTS

| | | | |
|---|---|---|---|
| 8,730,847 B1 | 5/2014 | Carino et al. | |
| 8,897,434 B2 * | 11/2014 | Perry | H04M 3/56 379/202.01 |
| 9,112,995 B2 | 8/2015 | Banta et al. | |
| 2003/0125954 A1 | 7/2003 | Bradley | |
| 2003/0231746 A1 | 12/2003 | Hunter et al. | |
| 2007/0036318 A1 * | 2/2007 | Gits | H04L 12/1813 379/202.01 |
| 2012/0278408 A1 | 11/2012 | Sefarian et al. | |
| 2013/0058472 A1 | 3/2013 | de Jong | |
| 2014/0036733 A1 * | 2/2014 | Teng | G06Q 10/109 370/260 |

OTHER PUBLICATIONS

Jun. 16, 2016 Written Opinion issued in International Application No. PCT/US2016/020576.

* cited by examiner

SYSTEMS AND METHODS FOR ACCESSING CONFERENCE CALLS

This application is a continuation-in-part application of U.S. application Ser. No. 14/641,599, which was filed Mar. 9, 2015, the contents of which are hereby incorporated by reference.

BACKGROUND OF THE INVENTION

The invention is related to conference calling, and more specifically, to systems and methods for reminding an individual of an upcoming conference call, and for facilitating or automating the process of connecting an individual to a conference call.

In a typical situation, an individual that wishes to participate in a conference call must dial an access telephone number just before the conference call is to begin. Once connected to the conference call bridge, the individual is asked for an access code. The individual can provide the access code by dialing a series of digits on his telephone keypad, or possibly by speaking the access code. Assuming the access code is valid, the individual's telephone is then connected to the conference call.

Some known systems for connecting an individual to a conference call can be configured to place an outgoing telephone call from the conference call bridge to the individual's telephone. In some instances, as soon as the individual answers the call, he is connected to the conference call. In other instances, after answering the call the individual must provide an access code before being connected to the conference call. Regardless, such a system can be advantageous in that the individual need not remember when to dial into the conference call, and the individual need not place a call, or remember the access telephone number, in order to be connected to the conference call.

Unfortunately, in order for such a system to operate, it must be pre-configured with the telephone numbers of those individuals that are to participate in the conference call. In addition, the conference call bridge must have the capability to place outgoing telephone calls, potentially on a large number of telephone lines, to add individuals to the conference call. If the conference call bridge lacks this capability, it is still necessary for the individual to remember when to dial into the conference call, and the individual must also have the access code available once the individual has been connected to the conference call bridge.

Moreover, when an administrator or individual in charge of setting up the conference call must enter a list of telephone numbers so that the conference call bridge can dial out to participants, control rests with that administrator. An individual who wishes to participate in the conference call does not have control over whether he will be added to the list, and/or whether the conference call bridge will call to add the individual to the conference call.

What is needed is a system that automates the process of connecting an individual to a conference call, even when the conference call bridge itself lacks any ability to place outgoing telephone calls to participants to add them to the conference call. Also, even if the conference call bridge has this capability, it would be desirable to have an alternate way of automatically connecting an individual to a conference call to relieve an administrator of the burden of pre-configuring a list of participant telephone numbers, and for those instances where one or more individuals who wish to participate in a conference call are mistakenly not added to such a list of telephone numbers. Further, it would be desirable for an individual to have an independent way of causing his telephony device to be automatically connected to a conference call, which does not rely upon an administrator's actions.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
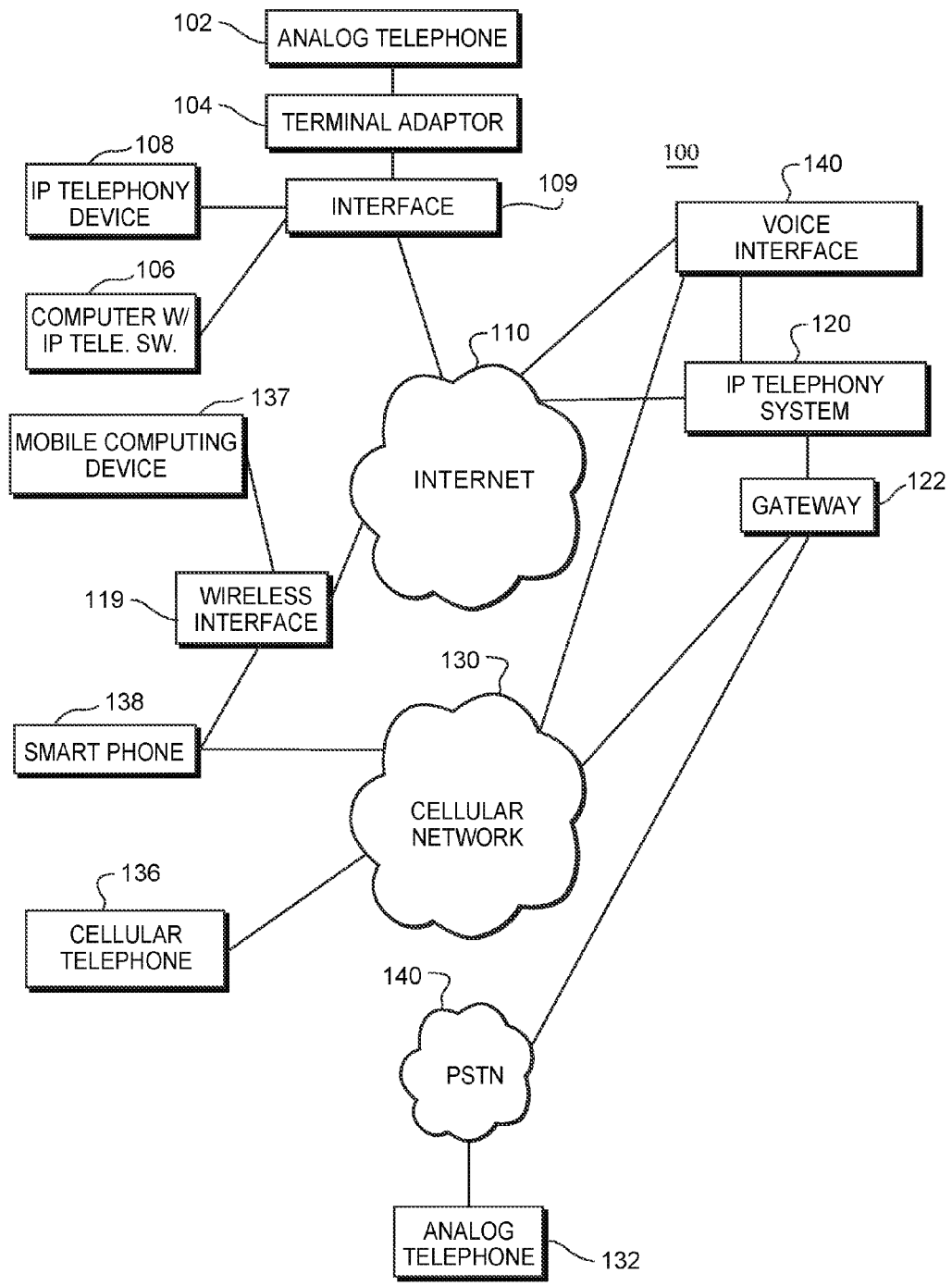
FIG. 1 is a diagram of a communications environment including various elements which are associated with voice interface and an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

A voice interface 140 is connected to the Internet 110. The voice interface 140 receives spoken input or commands from an individual and then performs certain actions in response to the input or commands. Those actions could include obtaining information and playing such information to the individual. Those actions could also include causing various other actions to occur, such as connecting the individual to a conference call, as will be explained below. The voice interface 140 may also be coupled to the cellular network 130, and/or to the IP telephony system 120.

Figure 2:
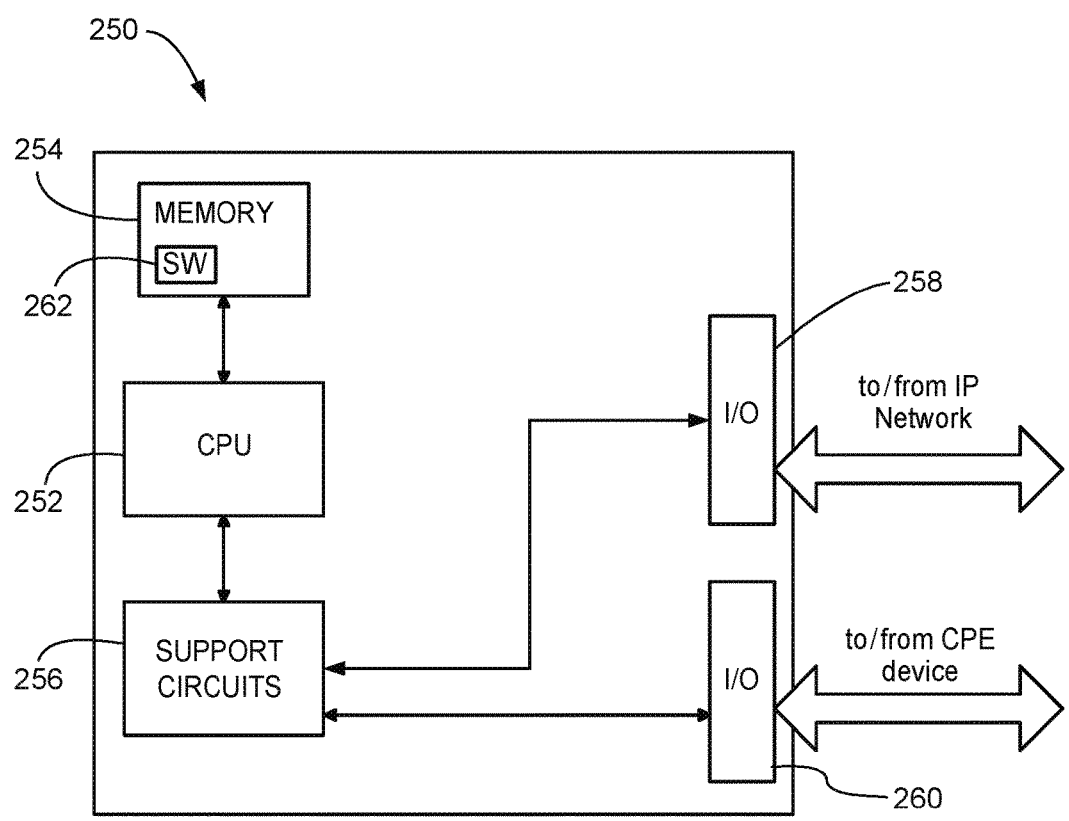
FIG. 2 is a diagram of various elements of a processor that forms part of an IP telephony system and/or part of a user's telephony device.

FIG. 2 illustrates elements of a computer processor 250 that can be used as part of the IP telephony system 120, as part of a voice interface 140, or as part of a user's telephony device, to accomplish various functions. The IP telephony system 120, the voice interface and a user's telephony device could each include multiple processors 250 along with their operating components and programming, each carrying out a specific or dedicated portion of the functions performed by the IP telephony system 120, the voice interface 140 or the user telephony device.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, the voice interface 140 and/or a user's telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct or participate in an IP telephony communication. An IP telephony device could be an IP telephone, a computer running IP telephony software, a telephone adaptor which is connected to an analog telephone, or some other type of device capable of communicating via data packets. An IP telephony device could also be a cellular telephone, a smartphone, or a portable or tablet computing device that runs a software client that enables the device to act as an IP telephony device. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™ or an Apple iPad™, which includes a speaker and a microphone. A software application loaded onto an Apple iPad™ can be run so that the Apple iPad™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Systems and methods embodying the invention are capable of sending a notification to an individual to warn the individual that a scheduled conference call is about to begin. Systems and methods embodying the invention may also be capable of automatically connecting an individual to an audio or video conference call. Descriptions of various embodiments are provided below. In these descriptions, some embodiments are implemented as part of an IP telephony system. Also, some of these embodiments are configured to automatically connect an individual's telephony device to an audio or video conference call. These descriptions of various embodiments should in no way be considered limiting. Embodiments could be implemented using other types of telephony systems, and embodiments could be implemented to connect an individual to a video conference, as opposed to an audio conference call.

In systems and methods embodying the invention, information about scheduled audio conference calls or video conferences are extracted from an individual's electronic calendar, and this information is used to determine when a scheduled conference call is set to begin, and when to provide a notification to the individual to warn the individual that the conference call is about to begin. This information may also be used to automatically connect the individual to a scheduled conference when it is time for the conference to begin. Further, if an individual issues a request to be connected to a conference call without identifying the conference call, information drawn from the individual's electronic calendar could be used to first identify the conference call to which the user likely wishes to be connected, and to then connect the user to that conference call. The information in an individual's electronic calendar may include information about appointments, deadlines, and scheduled audio and/or video conferences. An individual could have only a single electronic calendar, or an individual could have multiple electronic calendars. For example, a user could have a first electronic calendar that is associated with work related events, and one or more additional electronic calendars that are associated with the individual's home or private events.

Information in an electronic calendar relating to a scheduled audio conference call could include the start time and projected end time for the conference call, an access telephone number that is to be dialed to connect to a conference call bridge, as well as a participant and/or host access code that must be provided once one has connected to the conference call bridge. The information could also include information about a physical location of a scheduled event. The information could also include one or more URLs for webpages with information about an event or conference call. The information could also include a URL with a link to a video chat application that can be used to access the conference call. The information in the individual's electronic calendar might also include information about the other participants of the conference call, such as names, email addresses, telephone numbers and physical location information for the other participants. The information could also include status information for the individual and for the other participants.

Many widely used conference call bridges make it possible for the person setting up a conference call to easily send electronic invitations to participants via email. Each participant can then accept such an electronic invitation to easily add information about the conference call to their electronic calendar. Because of the way this information is recorded into an individual's electronic calendar, the information is typically recorded in a known, structured format. Moreover, the access telephone numbers that are used to access widely used conference call bridges are well known. Both of these factors can make it easy to locate information relating to a scheduled conference call in an individual's electronic calendar. Information in the electronic calendar may also include the topic or subject of the call, the organizer, and information about other potential participants.

Information in an electronic calendar relating to a video conference can also be recorded in the electronic calendar in much the same way as information relating to an audio conference. Such information could include an Internet IP address or URL to which the individual can connect with a web browser in order to access the video conference. This information could also include access codes and other electronic credentials that are required to join the video conference. Here again, because the information may be stored in a known, structured fashion, and because the IP addresses and/or URL's of widely used video conference systems are known, it can be easy to locate information in an individual's electronic calendar that relates to a scheduled video conference.

Figure 3:
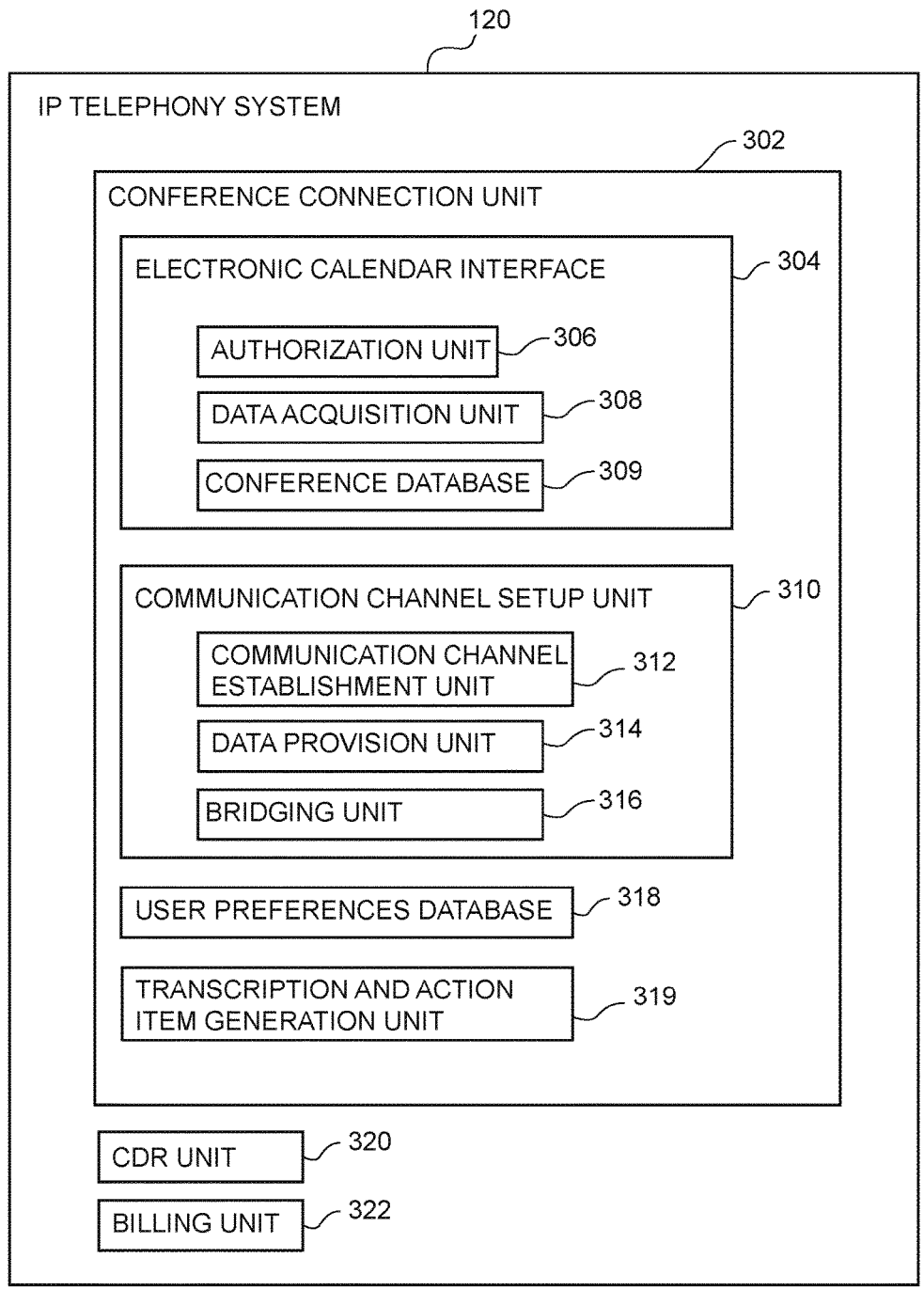
FIG. 3 is a block diagram illustrating selected elements of an IP telephony system embodying the invention.

FIG. 3 illustrates selected elements of an IP telephony system 120. The IP telephony system 120 includes a conference connection unit 302, which is configured to automatically connect an individual to an audio conference call or to a video conference. Features of the conference connection unit 302 are discussed in detail below, along with the methods performed by the conference connection unit 302.

The conference connection unit 302 includes an electronic calendar interface 304 that is configured to obtain information from individuals' electronic calendars in an automated fashion. The electronic calendar interface 304 includes an authorization unit 306 that is configured to obtain or provide authorizations that are necessary for a data acquisition unit 308 to obtain information from an individual's electronic calendar in an automated fashion, without user intervention or participation.

Typically, an individual is only able to access one of their electronic calendars by providing a user name and password. This prevents third parties from improperly accessing the information in an individual's electronic calendar and/or from improperly changing, adding or deleting information in the individual's electronic calendar. However, it is also common for an individual to grant a third party with read only access to their electronic calendar. In some instances, an individual might also grant a third party the ability to add, delete or modify information in the individual's electronic calendar.

In some embodiments, when an individual first signs up for a service that will automatically connect the individual to audio and/or video conferences, the individual would take steps to authorize the electronic calendar interface 304 to access and obtain information stored in the individual's electronic calendar. This could include providing user name and password information to the authorization unit 306, which would allow the data acquisition unit 308 to access information in the individual's electronic calendar. Authorizing access might also be accomplished in much the same way that the individual would authorize a third party to access the individual's electronic calendar. In some embodiments, it may be necessary to change settings within the individual's electronic calendar so that the data acquisition unit 308 can obtain access to the information in individual's electronic calendar.

In some instances, and depending on the electronic calendar, the data acquisition unit 308 may periodically review the information in an individual's electronic calendar to determine if any new audio or video conferences have been recorded in the electronic calendar. If so, information about the audio/video conference may be recorded in a conference database 309 that is maintained by the electronic calendar interface 304.

In alternate embodiments, it may be possible to configure the individual's electronic calendar to send information to the data acquisition unit 308. For example, it may be possible to configure the individual's electronic calendar to periodically upload all information in the electronic calendar to the data acquisition unit 308, or perhaps only information that has been added, deleted or changed since the last download occurred. In other instances, the individual's electronic calendar may be configured to only upload information about upcoming audio or video conferences. In still other instances, each time that a new event is added to the individual's electronic calendar, a copy of that information could be sent to the data acquisition unit 308. In still other instances, only information about audio and video conferences may be forwarded to the data acquisition unit 308 when that information is first added to the electronic calendar.

In still other alternate embodiments, it may not be necessary for the electronic calendar interface 304 to obtain and store an individual's credentials in order to access an individual's electronic calendar. Instead, the electronic calendar interface 304 may be capable of sending a query to an individual's telephony device asking for such information, and one or more software applications on the individual's telephony device may obtain and forward the requested information, as will be explained in more detail below.

Moreover, in some embodiments, the data acquisition unit may not obtain information about events or scheduled calls on an individual's electronic calendar by directly accessing the individual's electronic calendar. Instead, some third party entity that has been authorized to access the individual's electronic calendar may obtain information from that individual's calendar and then make this information available to the data acquisition unit. Here again, this would eliminate the need to obtain user and store user credentials in order to access information from that individual's electronic calendar.

The information that is acquired from an individual's electronic calendar could be parsed and saved in various ways, as would be apparent to one of ordinary skill in the art.

For example, the acquired information could be parsed based on key words such as "access number" and "access code," and also by recognizing digit patterns as telephone numbers. If keywords specifying a vendor or service provider are present, such as "WebExTm," parsing could be accomplished based on how that vendor or service provider typically arranges information about an audio or video conference.

The conference connection unit 302 also includes a communication channel setup unit 310, which is responsible for connecting an individual to an audio conference call or a video conference when the conference is about to begin, or whenever the user requests to be connected. The communication channel setup unit 310 includes a communication channel establishment unit 312 that is responsible for setting up a media link to the conference. In the case of an audio conference call, the communication channel establishment unit 312 would place a first telephone call to one of the individual's telephony devices, and a second telephone call to the conference call bridge. The bridging unit 316 would then bridge the first and second telephone calls to connect the individual's telephony device to the conference call bridge. As will be explained below, the timing of those calls, or the timing of the bridging of those calls, may be such that the individual need not hear any actions that must be performed to connect to the conference call, which can provide a good user experience.

In the case of a video conference, the communication channel establishment unit 312 would connect an individual's audio/video interface to the video conference system via a data connection. The individual's audio/video interface could be dedicated video conferencing equipment, it could be part of a desktop or laptop computer, it could be a smartphone, or it could be any number of other elements that combined give the individual audio and video capabilities.

As will be explained in greater detail below, a data provision unit 314 of the communication channel setup unit 310 is configured to interact with a conference call bridge or a video conference system to provide information, access codes, data or other credentials that are necessary for the individual to join an audio conference call or a video conference. This information would be obtained from the individual's electronic calendar by the data acquisition unit 308 and it may be stored in the conference database 309. The information is then used to gain access to a scheduled audio conference call or video conference on behalf of the individual in an automated fashion, as will be explained below.

The conference connection unit 302 also includes a user preferences database 318. Any number of different preferences that control or affect how the conference connection unit 302 operates for a given individual could be stored in the user preferences database 318. An individual could set certain preferences when first signing up for an automated connection service. An individual could also add preferences, or change them, at any time.

For example, an individual could specify that he is to be automatically connected to an audio conference call bridge at the exact time that the conference call is scheduled to begin. Alternatively, the individual could specify that he is to be connected a certain number of minutes before or after the scheduled start time.

The user preferences database 318 might also include information about which of the individual's telephony devices are to be automatically connected to an audio conference call. For example, this information could specify that during the hours of 9 am to 5 pm on weekdays, the individual's work telephone is to be automatically connected to any scheduled audio conference calls. This information would further specify that at other times, the individual's cellular telephone is to be connected to any scheduled audio conference calls. Thus, preferences about which telephony devices are to be connected could be time-of-day and day-of-the-week dependent. Preferences may also include simultaneous ringing of multiple telephony devices, or the sequential ringing of two or more telephony devices. The same sorts of preferences could be stored in the user preferences database 318 to indicate which of the individual's video interfaces is to be automatically connected to scheduled video conferences.

User preferences might also be based on an identity of the audio conference call or video conference to which the individual is being automatically connected. For example, the individual might specify that all audio conference calls that are setup through a first conference call bridge are to be automatically connected to a first telephony device, and that all audio conference calls setup through a second conference call bridge are to be connected to a second telephony device.

The user preferences database 318 might also specify when the auto connection service is to be active. For example, an individual could specify that the auto connection service is to be active for all conferences scheduled between 9 am and 5 pm on weekdays, but it is to be inactive at all other times. If the system is able to obtain information about the location of an individual's telephony device, such as a GPS enabled smartphone, the user preferences could also be location dependent.

The user preferences database 318 might also include information about whether an individual is to be provided with reminders of upcoming conferences, and if so, when the reminders are to be provided. In some embodiments, a reminder of an upcoming conference could also query the individual about whether the individual wishes to be automatically connected to the conference when it is about to begin. If so, the automated connection process would occur. If not, the individual would have to follow normal manual procedures to connect to the conference.

The user preferences database 318 might also contain information about what to do if an individual fails to answer an automated connection attempt. For example, if the conference is an audio conference call, and the system attempts to connect the individual to the audio conference call by placing a telephone call to a first of the individual's telephony devices, the individual's preferences may specify that if the individual does not answer that telephone call, the system is to make a second attempt to connect the individual by placing a second telephone call to a second of the individual's telephony devices.

As illustrated in FIG. 3, the IP telephony system 120 also includes a call detail record (CDR) unit 320 that stores call detail records that are created for telephony communications handled by the IP telephony system 120. A billing unit 322 then generates bills based on the information stored in the CDRs. An IP telephony system 120 would have additional elements not shown in FIG. 3. Likewise, the conference connection unit 302 could have additional elements that are not shown in FIG. 3. Also, an IP telephony system 120, and a conference connection unit 302, could have fewer than all of the elements illustrated in FIG. 3. Thus, the depiction provided in FIG. 3 should in no way be considered limiting.

Figure 4:
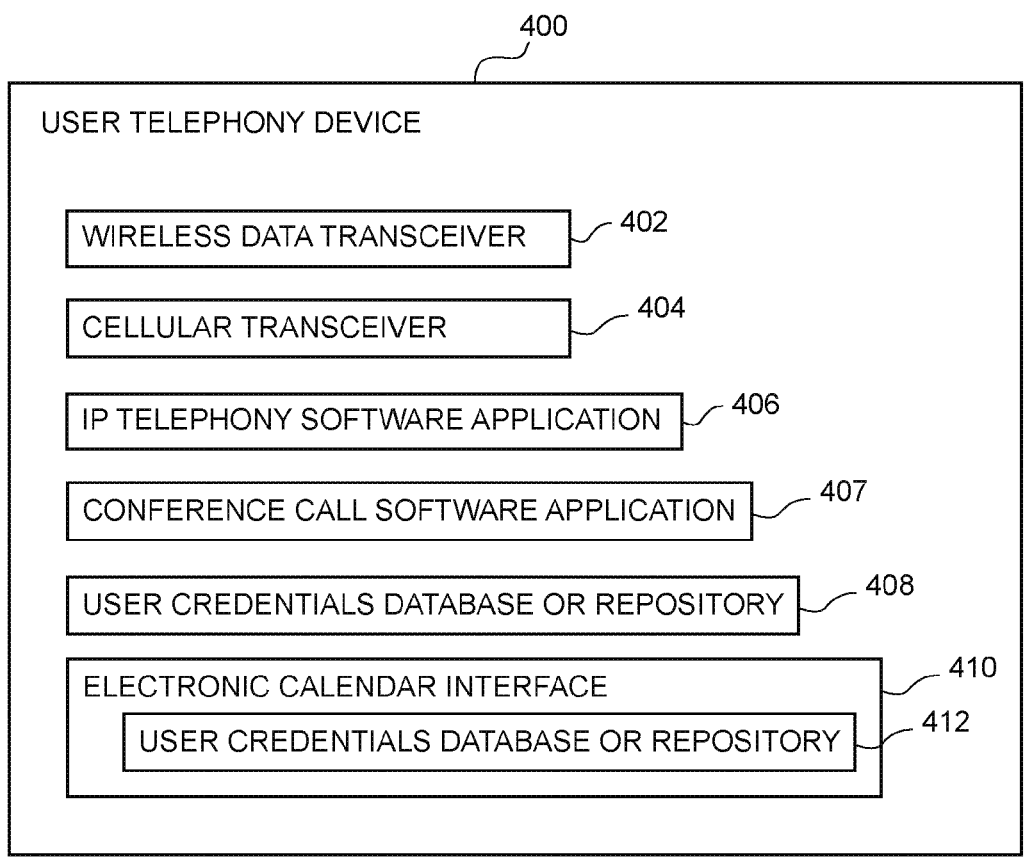
FIG. 4 is a block diagram illustrating selected elements of a user telephony device.

Elements of a user telephony device 400 are depicted in FIG. 4. The user telephony device 400 includes a wireless data transceiver 402 which is capable of communicating with a wireless access point, such as a wireless router. The wireless data transceiver 402 allows the user telephony device 400 to wirelessly communicate over a data network, such as the Internet.

The user telephony device 400 also includes a cellular transceiver 404. The cellular transceiver 404 communicates with a typical cellular telephony system to provide the user telephony device 400 with its native telephony service.

The user telephony device 400 also includes an IP telephony software application 406, which would be stored in a memory device of the user telephony device 400. The IP telephony software application 406 could be run to provide the user with IP telephony services. In addition, the IP telephony software application 406 may be capable of receiving push notifications from a push notification service, as explained in more detail below. Moreover, the receipt of a push notification that is directed to an IP telephony software application 406 on the user telephony device 400 could cause the user telephony device 400 to load and run the IP telephony software application 406 so that the IP telephony software application 406 can assist in handling the incoming push notification as well as other functions.

The user telephony device 400 may also include a user credentials database or repository 408. User credentials stored in the user credentials database or repository 408 could be utilized to access various different external systems which store information for the user of the user telephony device 400. For example, user credentials stored in the user credential database or repository 408 could be utilized to access a user's electronic calendar on a separate platform which is accessible via a data network.

The user telephony device 400 may also include an electronic calendar interface 410 which can interface with an internal electronic calendar present on the telephony device 400, or external electronic calendar that is stored on a different device. The electronic calendar interface 410 could itself include a user credential database or repository 412 which holds user credentials that are used to access the user's information in an electronic calendar stored on a different device.

In some embodiments, a user telephony device 400 will include all of the features discussed above. In alternate embodiments, only a subset of the elements discussed above could be present on a user telephony device 400. Moreover, a user telephony device 400 could include only some of the above discussed features, as well as a wide variety of additional features.

Figure 5:
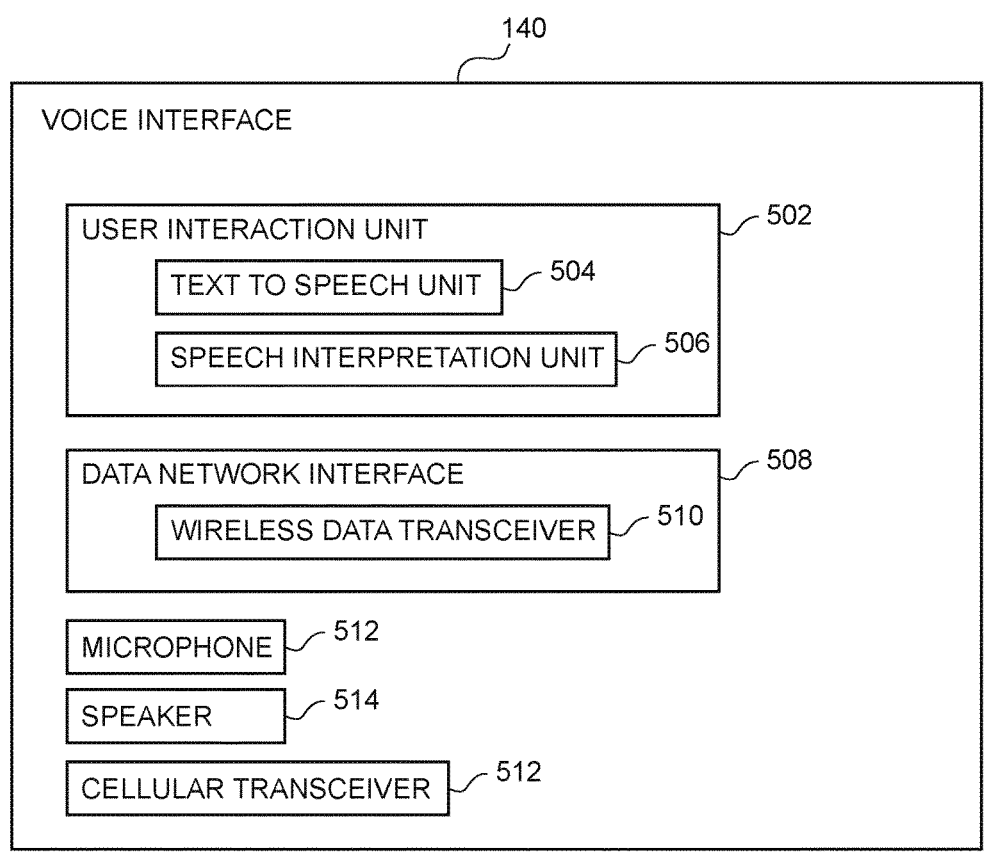
FIG. 5 is a block diagram illustrating selected elements of a voice interface which can perform at least some steps to connect an individual to a conference call.

FIG. 5 illustrates elements of a voice interface 140. The voice interface 140 allows a user to obtain information and services utilizing voice commands and audio prompts that are played to the user. In a typical embodiment, the voice interface 140 would be connected to a data network such as the Internet via a data network interface 508. The data network interface 508 could include a hardwired connection to a data network, or the data network interface 508 could access the data network via a wireless data transceiver 510. The wireless data transceiver 510 would connect wirelessly to a wireless access point which provides access to a data network.

The voice interface 140 also includes a user interaction unit 502. The user interaction unit 502 includes a text-to-speech unit 504 which is capable of converting text into speech, and then playing the speech to the user over a speaker 514. The user interaction unit 502 also includes a speech interpretation unit 506 which receives spoken user input via a microphone 512, and which interprets that received spoken input. The speech interpretation unit 506 could include its own native voice or speech recognition capabilities, or the speech interpretation unit 506 could utilize the services of an external voice or speech recognition unit which is accessible via a data network through a connection provided by the data network interface 508.

In some embodiments, the voice interface 140 may also include a cellular transceiver 516. The cellular transceiver 516 could be used to access a data network via a cellular telephony services provider. This would provide an alternate path for obtaining access to a data network when the data network interface 508 is unable to establish a connection to the data network.

A user could make use of a voice interface 140 as depicted in FIG. 5 to obtain information, and to request various services, as is explained in greater detail below. For example, the user could issue a speech command asking the voice interface 140 to provide an indication of the weather forecast for today. The voice interface 140 would then access a weather information service, either through the data network interface 508 or via a cellular transceiver 516. The obtained information could then be played to the user over the speaker 514 through the user interaction unit 502.

In some embodiments, the voice interface 140 may be capable of responding to a user request for services by directing other elements to satisfy the user's request. As a result, the voice interface 140 may issue commands to other devices or systems through a data network, as will be explained in greater detail below.

Figure 6:
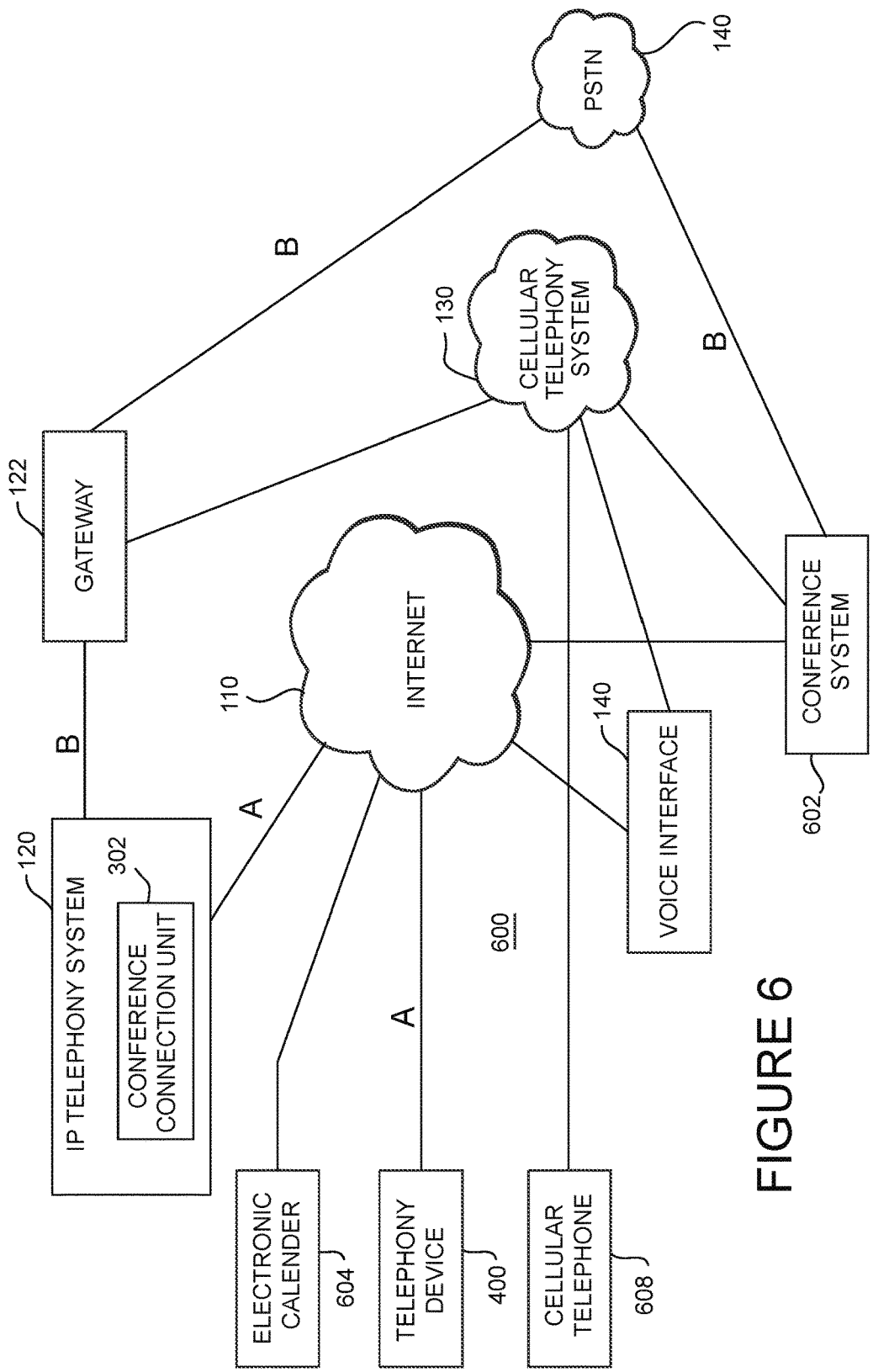
FIG. 6 is a block diagram illustrating a communications environment that is used to explain how an individual can be reminded of an upcoming conference call and to explain how an individual can be automatically connected to a scheduled conference call.

FIG. 6 illustrates elements of a communications environment 600 that will be used to help explain how some systems and methods embodying the invention operate. As shown therein, an IP telephony system 120 like the one described above in connection with FIG. 3 includes a conference connection unit 302. The IP telephony system 120 is capable of setting up communications channels via the Internet 110, via a cellular telephony system 130, and via a PSTN 140. A conferencing system 602 is capable of setting up and and/or hosting conferences. The conferences could be audio conference calls or video conferences. For purposes of the following explanation, we will assume that the conferencing system 602 is configured to provide audio conference calling services. FIG. 4 also illustrates that an individual has an electronic calendar 604, a telephony device 400 and a cellular telephone 608.

Methods embodying the invention will now be described with references to the following flowcharts and the communications environment 600 illustrated in FIG. 6. References are also made to the conference connection unit 302 illustrated in FIG. 3, the user telephony device 400 illustrated in FIG. 4 and the voice interface 140 illustrated in FIG. 5.

Figure 7:
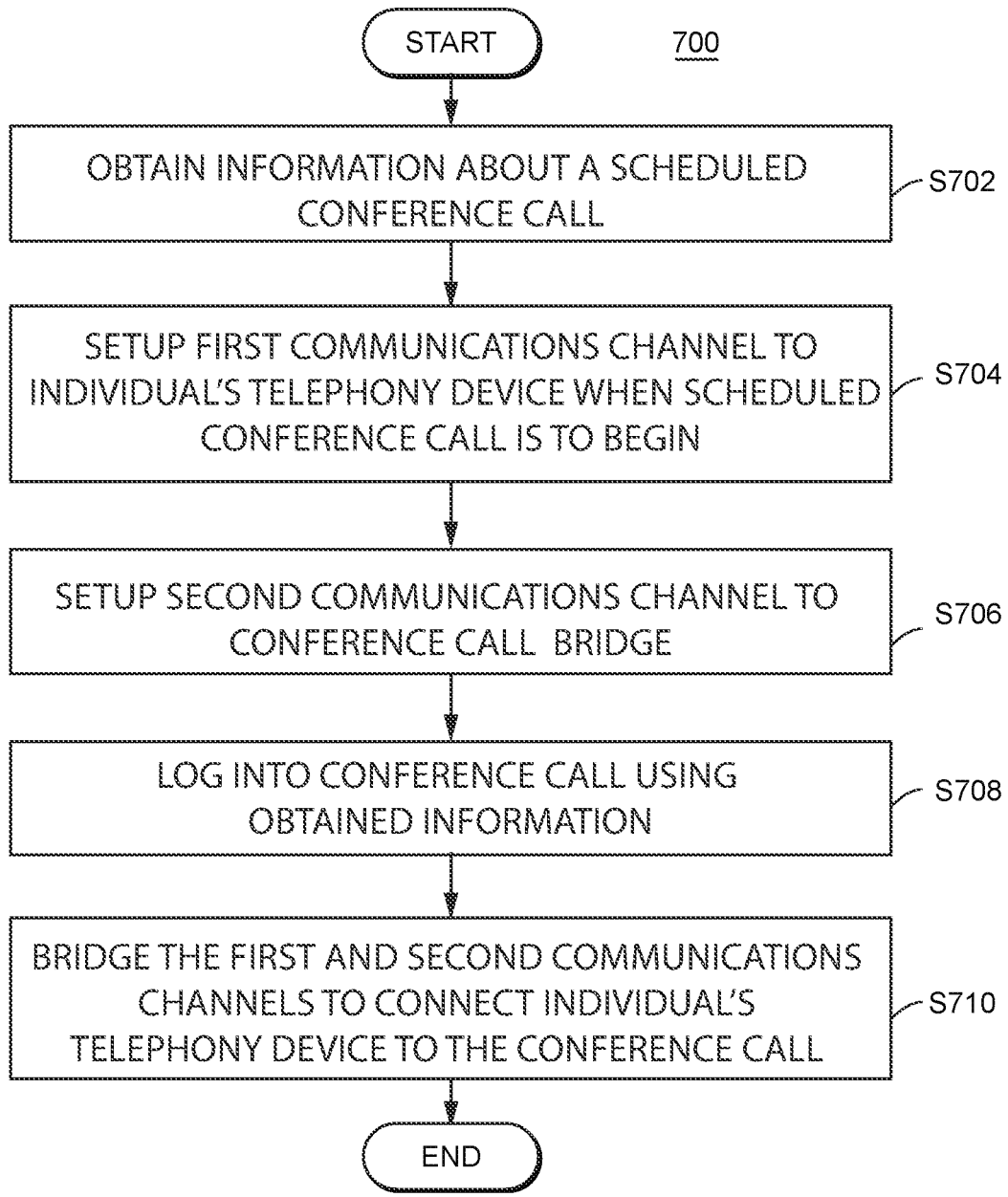
FIG. 7 is a flow diagram illustrating steps of a method performed by elements of an IP telephony system to automatically connect an individual's telephony device to a scheduled conference call.

FIG. 7 illustrates a method 700 of connecting an individual to an audio conference call in an automated fashion which is performed by elements of a conference connection unit 302. The method begins and proceeds to step S702, where a data acquisition unit 308 obtains information about a scheduled conference call from a first individual's electronic calendar 404. This information is then stored in the conference database 309. As explained above, the information could be obtained when the data acquisition unit 308 performs a periodic review of information in the individual's electronic calendar 404. Alternatively, this information could be obtained because the individual's electronic calendar 404 sent the information to the data acquisition unit 308.

When the time for the scheduled conference call approaches, in step S704, the communication channel establishment unit 312 sets up a first communication channel to one of the individual's telephony devices. For example, the first communications channel could be established by placing an outgoing telephone call to the first individual's telephony device 400. In alternate embodiments, the first communications channel A could be setup as a data link between the communication channel establishment unit 312 and a software application running on one of the first individual's telephony devices, or in some other way. In this example, and as illustrated in FIG. 6, the first communications channel A would run from the IP telephony system 120 to the first individual's telephony device 400 as an IP telephone call that traverses the Internet 110.

Next, in step S706, the communication channel establishment unit 312 places an outgoing telephone call to an access telephone number of the conference system 602 to access the conference call bridge for the scheduled conference call. This access telephone number is part of the information relating to the scheduled conference call that was obtained from the individual's electronic calendar 604. When this call is connected, it establishes a second communications channel B between the conference connection unit 302 and the conference call bridge provided by the conference system 602. As depicted in FIG. 6, this second communications channel, labeled B, passes from the IP telephony system 120 to the gateway 122, then to the PSTN 140, then on to the conference system 602.

In step S708, the data provision unit 314 provides the conference call bridge with any access information required by the conference call bridge to access the scheduled conference call. This could include an access code that is part of the information obtained from the individual's electronic calendar 604.

Figure 8:
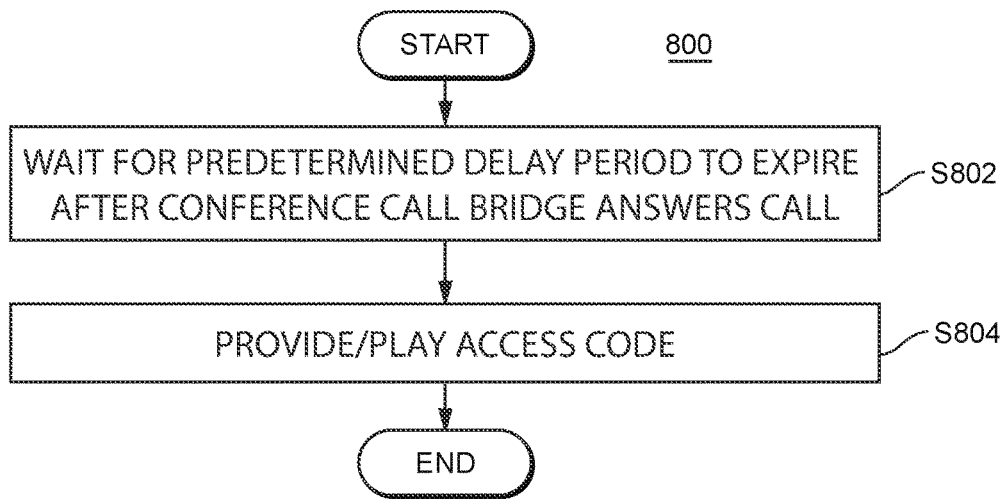
FIG. 8 is a flow diagram illustrating steps of a first method performed by elements of an IP telephony system to access a conference call using information obtained from an individual's electronic calendar.

FIG. 8 illustrates a method that could be performed as step S708 of the method illustrated in FIG. 7. The method would begin when the telephone call placed to the conference call bridge is answered by the conference system 602. As shown in FIG. 8, the method then proceeds to step S802, where a predetermined delay period is allowed to expire. This delay is intended to elapse while the conference call bridge plays an audio recording that asks the calling party to enter an access code. The predetermined delay period that is allowed to elapse in step S802 could vary depending on the configuration of the conferencing call bridge.

Next, in step S804, the data provision unit 314 provides the access code obtained from the individual's electronic calendar 604 and which is needed to access the scheduled conference call. The provision of the access code could include the data provision unit 314 playing the DTMF tones that correspond to the digits of an access code. Of course, the access code could also be provided to the conference calling bridge in other ways. For example, if the data provision unit 314 is providing information to a video conference system, providing the information could include sending data to the video conference system via a data network. The method would then end, which essentially means proceeding to step S710 of the method illustrated in FIG. 7.

In the method described above in connection with FIG. 8, a predetermined delay period is allowed to expire after the call is connected to the conference call bridge to allow time for the conference call bridge to play a recording asking for the input of an access code. In alternate embodiments, this same basic process could be accomplished in different ways. For example, instead of waiting for a predetermined delay period to expire, the conference connection unit 302 could monitor the audio on the call to determine when the conference call bridge has finished asking the caller to input an access code. In yet another alternate embodiment, speech recognition assets could be employed to determine exactly what the conference call bridge asks for, and once the request is finished, the data provision unit 314 would provide the requested information.

The conference connection unit 302 could store profile information for various different commonly used conference systems. The profile information would indicate the way in which the conference system operates and how it requests information from a user. The telephone number that is used to access a conference system will likely give an indication of when a particular conference system is being called, as certain telephone numbers will be associated with a particular conference system. If the identity of the conference system can be determined before a telephone call is placed to access the conference system, the profile information corresponding to the conference system could be used to guide the conference connection unit 302 in accessing a conference call.

Figure 9:
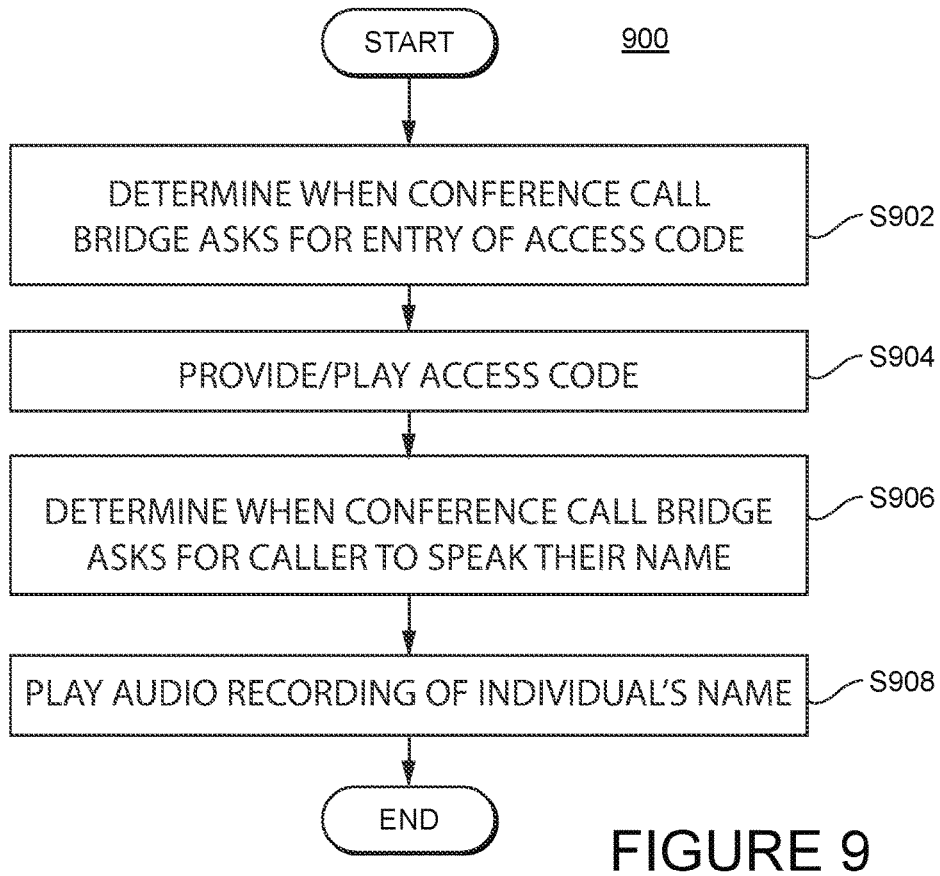
FIG. 9 is a flow diagram illustrating steps of a second method performed by elements of an IP telephony system to access a conference call using information obtained from an individual's electronic calendar.

FIG. 9 illustrates yet another method for accomplishing step S708 of the method illustrated in FIG. 7. This method 900 would begin after the conference connection unit 302 has placed a call to the conference system 602 to establish the second communications channel B, and after the conference call bridge has answered the call. During this method, the conference call bridge asks for an access code, and then also asks the caller to speak their name. Some conference call bridges operate in this fashion, and take a recording of whatever the caller says after they are asked for their name. This recording is then played to other people that are already on the conference call as part of an announcement that indicates a new caller is joining the conference call.

The method proceeds to step S902 where the data provision unit 314 determines when the conference call bridge has asked for entry of an access code. In step S904, the data provision unit 314 provides the access code to the conference call bridge. Next, in step S906, the data provision unit 314 determines when the conference call bridge asks the caller to speak their name. As noted above, speech recognition assets could be used to make this determination. Alternatively, if a particular conference call bridge routinely asks for this information after the access code has been input, step S906 could simply involve monitoring the audio to determine when the conference call bridge has finished asking the caller to speak their name. In still other embodiments, step S906 could involve waiting for a predetermined delay period to expire after the access code has been input.

In step S908, the data provision unit 314 plays an audio recording of the user's name to the conference call bridge. The audio recording could be one that the individual has provided during a configuration process. Alternately, the data provision unit 314 could generate the audio of the individual's name. The method would then end, which essentially means proceeding to step S710 of the method illustrated in FIG. 7.

Returning now to a discussion of the method illustrated in FIG. 7, once the first and second communications channels have been established, and login to the conference call has been accomplished, the method proceeds to step S710, where the bridging unit 316 bridges the first communications channel A and the second communications channel B to establish a communications channel between the first individual's telephony device 400 and the conference call being hosted by the conference system 602. The method then ends.

As mentioned above, an individual's preferences may specify that if the individual fails to answer a call placed to one of the individual's telephony devices during step S704 of the method in FIG. 7, the communication channel establishment unit 312 is to make a second attempt to reach the individual via one of the individual's other telephony devices. For example, if the call placed to the first individual's telephony device 400 was not answered, step S704 could further include making a second telephone call to the first individual's cellular telephone 608.

If the communications channel establishment unit 312 is unable to setup a first communications channel to one of the individual's telephony devices, the method would end without the need to perform any of the steps for setting up the second communications channel or logging into the conference call. Similarly, when the communications channel establishment unit 312 attempts to setup the first communications channel, the individual may be asked if the individual wishes to be connected to the conference call. If the individual responds in a negative fashion, the method would end without the need to perform any of the steps for setting up the second communications channel or logging into the conference call.

Also, as part of the step of setting up the first communications channel, the communications channel establishment unit 312 may play a recording to the individual. The recording could include information about the conference call to which the individual is being connected, and that information could be drawn from the individual's electronic calendar as well. The information could include the topic of the conference call, the identity of the organizer, the identity of other participants, and other information. This information could be played to the individual using text-to-speech functionality.

In the method described above, we assumed that once the second communications channel had been established between the conference connection unit 302 and the conference call bridge, that the data provision unit 314 is able to successfully access the conference call by providing the required information. However, if the data provision unit 314 experiences difficulty in accessing the conference call, the method could nevertheless proceed to step S710, where the first and second communications channels are bridged. At that point, the individual would be connected to the conference call bridge, and the individual could intervene and provide whatever information is required to access the conference call. If this sequence of events occurs, the conference connection unit might also play a recording to the individual to alert the individual to the fact that it has been unsuccessful in accessing the conference call, and to inform the individual that he may need to provide additional information to access the conference call.

In the foregoing description, the first communications channel between the conference connection unit 302 and the individual's telephony device is setup before the second communications channel between the conference connection unit 302 and the conference system is setup. In alternate embodiments, the communications channels could be setup simultaneously, or the communications channel to the conference system could be setup before the communications channel to the individual's telephony device is setup. In some embodiments, the first and second communications channels may be bridged only after the conference connection unit 302 has been successful in logging into the conference call over communications channel B. This would prevent the user from hearing any of the activity that occurs while the conference connection unit 302 is interacting with the conference system 602, which may provide a better user experience.

Figure 10:
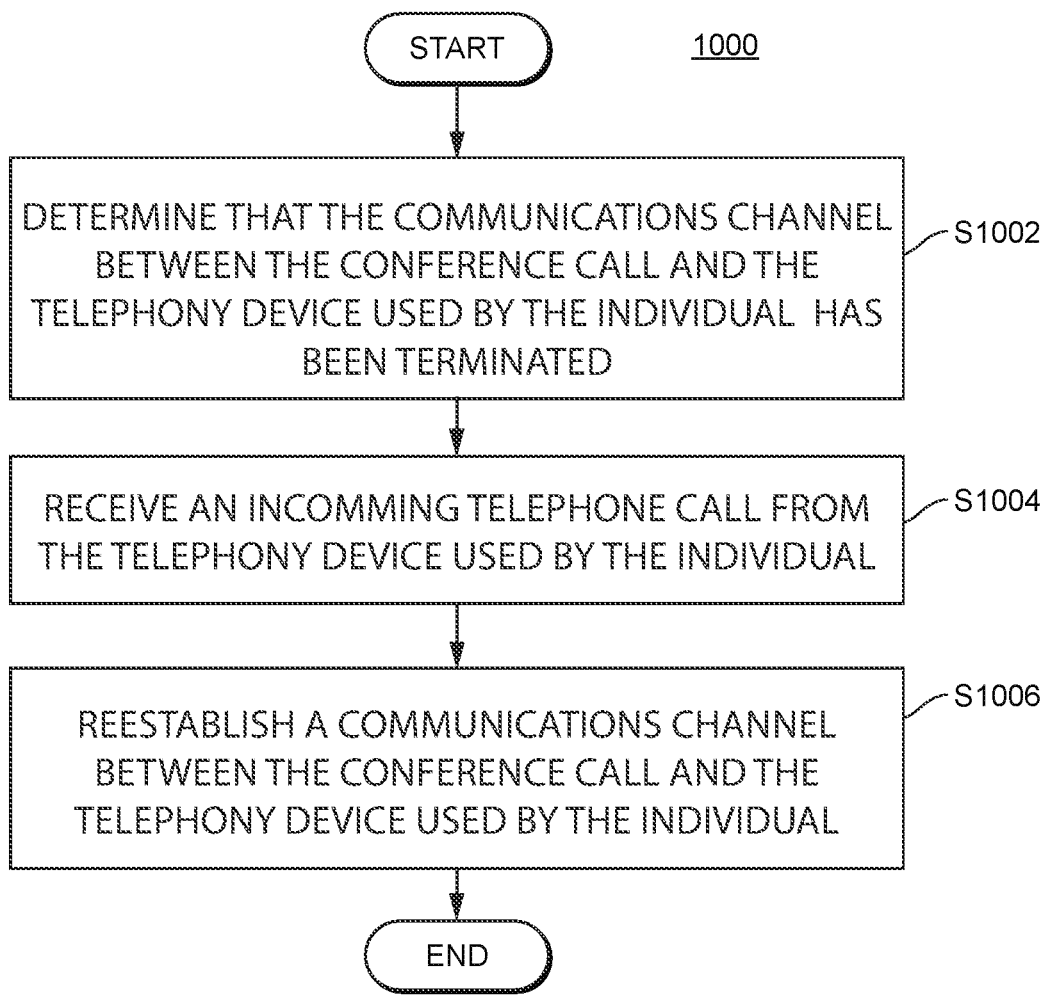
FIG. 10 is a flow diagram illustrating steps of a method of reconnecting an individual to a conference call if the individual is prematurely disconnected from the conference call.

FIG. 10 illustrates steps of a method that could be performed to handle a common problem encountered by conference call participants, which is being prematurely disconnected from the conference call. This could happen for a variety of reasons. It commonly occurs when the participant is using a mobile telephone to participate in a conference call, and the mobile telephone temporarily loses its signal.

The method illustrated in FIG. 10 is performed by the conference connection unit 302 when an individual that has previously been connected to a conference call by the conference connection unit 302 is prematurely disconnected from the conference call while the conference call is ongoing. The method 1000 begins and proceeds to step S1002, where the communication channel setup unit 310 determines that the communications channel between the conference call and the telephony device used by the individual has been terminated. This determination could be made in a variety of ways, as would be known to those of ordinary skill in the art. For example, the communication channel setup unit 310 could note when a communications channel between an individual's telephony device and a conference call system has become disconnected.

The individual who was participating in the conference call would cause their telephony device to place an outgoing telephone call to the telephone number from which the last incoming call was received. This will be the telephone number of a telephone line used by the communication channel setup unit 310 to setup the first communications channel between the IP telephony system 120 and the individual's telephony device. In the method illustrated in FIG. 10, in step S1004, the communication channel setup unit 310 receives that incoming telephone call from the individual's telephony device. Step S1004 might also include the communications channel setup unit 310 determining that the incoming telephone call is from the telephony device used by the individual. This determination could be made using caller ID information associated with the incoming telephone call.

In step S1006, the communication channel setup unit 310 acts to reestablish a communications channel between the conference call and the telephony device used by the individual. This could include setting up a new communications channel between the IP telephony system and the conference call bridge, and providing the access code and any other information required to log into the conference call a second time. This could also include bridging the new communications channel between the IP telephony system and the conference call with the incoming call received from the telephony device used by the individual.

In some embodiments, when the communications channel setup unit 310 receives the incoming telephone call from the telephony device used by the individual, a check is performed to determine if the current time is within the time window that was scheduled for the conference call. In this embodiment, only if the current time is within this window would the communication channel setup unit 310 act to reestablish a communications channel between the conference call and the telephony device used by the individual.

Figure 11:
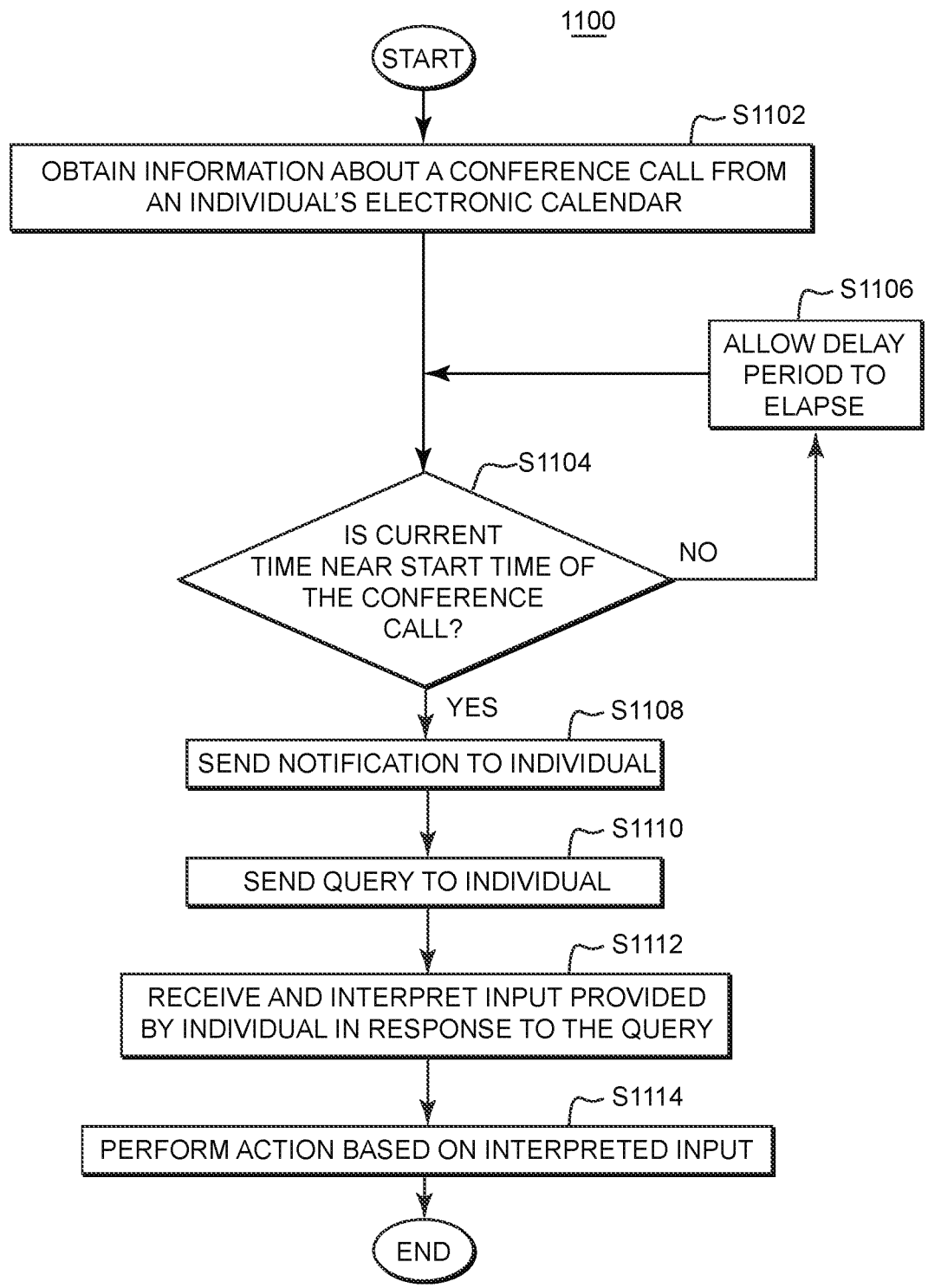
FIG. 11 is a flow diagram illustrating steps of a method of notifying an individual of an upcoming telephone call, and for also taking some action after the notification has been provided to the individual.

FIG. 11 illustrates steps of a method which would be performed to proactively alert an individual that an upcoming conference call is about to begin. The method would begin and proceed to step S1102 where information about a conference call is obtained from an individual's electronic calendar. As noted above, this information could be obtained automatically on a periodic basis by a data acquisition unit 308 of an electronic calendar interface 304 of a conference connection unit 302, as illustrated in FIG. 3. Alternatively, the conference database 309 of the electronic calendar interface 308 could receive periodic updates from an individual's electronic calendar. Regardless, once the information has been obtained, it can be used to proactively warn an individual when an upcoming conference call is about to begin.

The method then proceeds to step S1104 where the current time is compared to the scheduled start time of the conference call. This aspect of the method could be configurable by a user. In other words, the user may specify that if the current time is within 5 minutes of the start time of a conference call, then a notification is to be sent to the individual. Alternatively, the user could specify any other time duration prior to the scheduled start time of the conference call at which he wishes to receive a notification.

If the check performed in step S1104 indicates that the current time is not near to the start time of the conference call, the method proceeds to step S1106, and a delay period is allowed to expire. The method then loops back to step S1104 to check whether the current time is near the start time of the conference call. The process will repeat until the current time is within the predetermined window set by the user. When the check performed in step S1104 indicates that the current time is near the start time of the conference call, the method proceeds to step S1108.

In step S1108, a notification is sent to the individual to alert the individual to the fact that the conference call is about to begin. The notification could be sent to the individual in a variety of different ways. In some embodiments, a push notification is sent to a telephony device being used by the individual. In alternate embodiments, a SMS or MMS text message could be sent to the individual's telephony device. In still other embodiments, an email message could be sent to the individual. Moreover, the system responsible for sending the notification to the individual could cause an IP telephony software application on a user's telephony device to issue a warning in a form of a tone, a vibration, and an associated message could be displayed or played to the individual. In some embodiments, the notification could be played to the user by the voice interface 140 as an audible spoken message. As one of ordinary skill in the art would appreciate, the notification could also be sent to the individual in a variety of other ways.

In some embodiments, once the notification has been sent to the individual, the method would end. In other embodiments, additional actions may occur after the notification has been sent to the individual.

For example, the method could include an optional step S1110, which involves sending a query to the individual. The query could ask the individual whether the individual now wishes to be connected to the conference call. In some embodiments, notification sent in step S1108 and the query sent in step S1110 may be combined in an audio or spoken message that is played to the individual, such as by the voice interface device 140. Alternatively, or in addition, the query could ask the individual to identify a telephony device, or some other type of electronic device, to which the conference call should be connected.

The method then proceeds to optional step S1112 where input provided by the individual is received and interpreted. For example, if the query asked whether the individual wished to now be connected to the conference call, the individual's yes or no response could be received and interpreted in step S1112. If the individual indicated that he did wish to be connected to the conference call, the method would proceed to optional step S1114 where the individual is actually connected to the conference call. The method would then end. If the individual also provided an indication of the telephony device which was to be connected to the conference call, then optional step S1114 would involve connecting that telephony device to the conference call.

In the embodiment discussed above, information about a conference call is obtained from an individual's electronic calendar and stored in a conference database 309 of an electronic calendar interface 304 of a conference connection unit 302. Elements of a conference call connection unit 302 then act to issue a notification to the individual and possibly to connect the individual to the conference call.

In alternate embodiments, a software application on the individual's telephony device could perform all or parts of the method illustrated in FIG. 11. For example, information about an upcoming conference call could be obtained by an IP telephony software application 406 or a conference call software application 407 on the individual's telephony device 400, as illustrated in FIG. 4. The IP telephony software application 406 or conference call software application 407 could then perform the remaining steps illustrated in FIG. 11. In this alternate embodiment, a conference call connection unit 302 of an IP telephony system would not be involved in obtaining information about a conference call, in sending a notification to the individual, or in connecting the individual to the conference call. Instead, the IP telephony software application 406 or conference call software application 407 on the user's telephony device would be responsible for performing all these functions.

In still other embodiments, an IP telephony software application 406 or a conference call software application 407 on the individual's telephony device could perform a part of the functions illustrated in FIG. 11, and a conference call connection unit 302 could perform the other functions illustrated in FIG. 11. For example, an IP telephony software application 406 or a conference call software application 407 could be responsible for obtaining information about a conference call from an individual's electronic calendar, and for sending a notification to the individual when the start time of the conference call is drawing near. However, the actions in querying the individual about whether and how to be connected to the conference call, and actually connecting the individual to the conference call, could all be performed by a conference call connection unit 302.

In the method discussed above in connection with FIG. 11, one of the optional steps S1114 involves performing an action based upon interpreted input provided by the individual. If the individual requests to be connected to the conference call, optional step S1114 could involve establishing a communications channel between the conference call and a telephony device utilized by the individual. In some embodiments, the establishment of that connection to the conference call could be performed substantially as illustrated in FIG. 7, and as discussed above in connection with FIG. 7. In that method, information needed to access the conference call, such as a dial-in telephone number and an access code, are obtained from the individual's electronic calendar. This information could be obtained by elements of a conference call connection unit 302, or by an IP telephony software application 406 or a conference call software application resident on the individual's telephony device.

Figure 12:
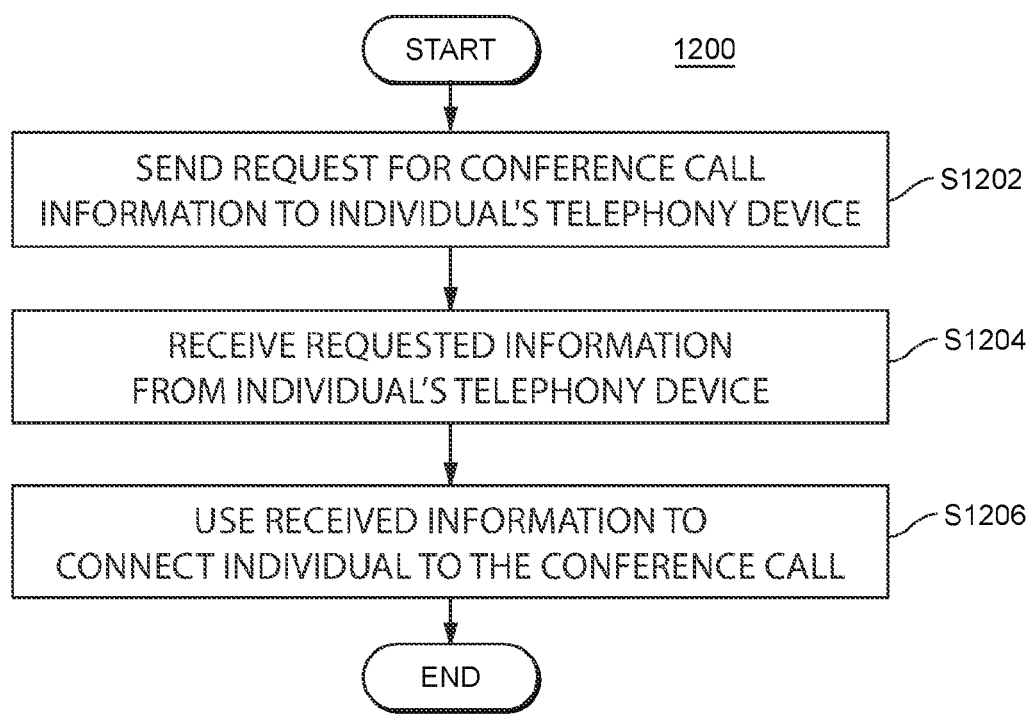
FIG. 12 is a flow diagram illustrating steps of a method of obtaining information from an individual's telephony device that is to be used to connect the individual to a conference call.

FIG. 12 illustrates steps of a different method which could be used to obtain information from a user's electronic calendar which is then used to access a conference call. The method 1200 illustrated in FIG. 12, begins and proceeds to step S1202, where an electronic calendar interface 304 or a communication channel setup unit 310 sends a query to an individual's telephony device for the information that will be required to connect to the conference call. That information can include the dial-in telephone number, an access code, and possibly a host code in instances where the individual is to be the host of the conference call. This query could be received by either an IP telephony software application 406 or a conference call software application 407 on the individual's telephony device. The IP telephony software application 406 or the conference call software application 407 then act to obtain this information from the individual's electronic calendar.

In a case of a smartphone, it is common for an individual's smartphone to include an electronic calendar interface 410 which provides the user with access to his own electronic calendar. User credentials that are stored in a database or repository on the individual's smartphone allow the electronic calendar interface 410 to obtain information from the individual's electronic calendar. As a result, the credential information needed to access the individual's electronic calendar is already present on the individual's telephony device.

In a method as illustrated in FIG. 12, the IP telephony software application 406 or the conference call software application 407 utilize the individual's credentials in either a credentials database or repository 408 on the telephony device, or that are present in an electronic calendar interface 410 on the telephony device in order to access the necessary information regarding a conference call from the individual's electronic calendar. The method then proceeds to step S1204 where this information is provided back to the electronic calendar interface 304 or the communication channel setup unit 310 of the conference connection unit 302. The communication channel setup unit 310 then utilizes this received information in step S1206 to connect the individual to the conference call. The method then ends.

In a method as illustrated in FIG. 12, the conference connection unit 302 does not need to store user credentials in order to obtain access to information about conference calls from the individual's electronic calendar. This can be advantageous, as it would prevent a hacker from hacking into the conference connection unit 302 and obtaining user credentials for a large number of different users. By utilizing the user's credentials, and permissions granted by the user to one or more third party applications that can access the native calendar application and which are stored on the individual's telephony device in order to gain access to information about conference calls from the individual's electronic calendar, the need to store user credentials on the conference connection unit 302 is eliminated.

In some instances, it may be necessary for an individual to provide permission in advance for a method as illustrated in claim 12 to be possible. For example, a notification may be sent to the individual's telephony device, the notification asking for permission to view the individual's calendar information. If the individual accepts the request, thereafter it will be possible for the conference connection unit to obtain information from the individual's electronic calendar using the individual's credentials stored on the individual's telephony device.

Figure 13:
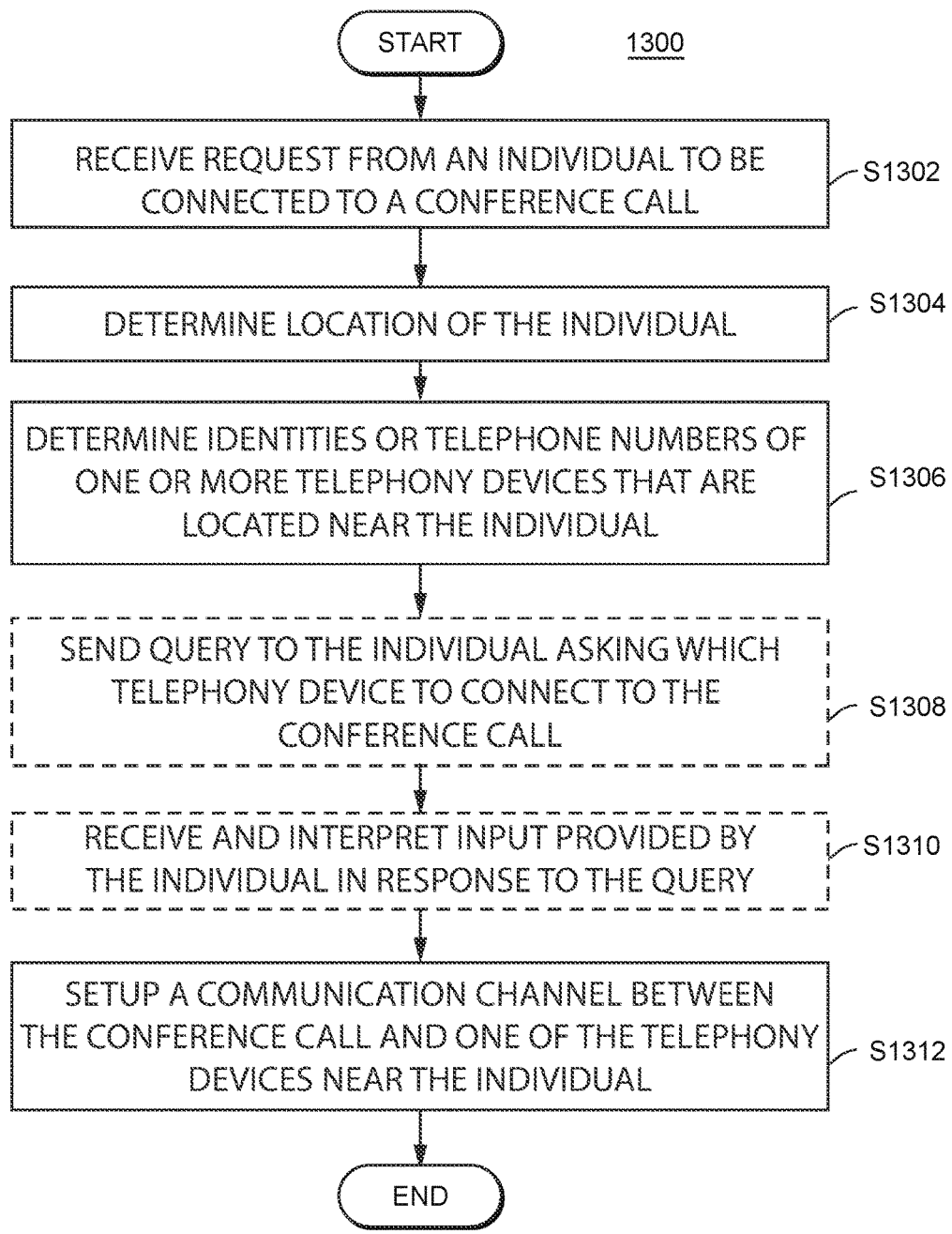
FIG. 13 is a flow diagram illustrating steps of a method of automatically connecting an individual to a conference call.

In the method illustrated in FIG. 11, the query that is sent to an individual in optional step S1110 could be a query asking whether the user wishes to be connected to a conference call. The input received and interpreted in optional step S1112 could be the user's response asking to be connected to the conference call. The action performed in optional step S1114 could then be connecting the user to the conference call. FIG. 13 illustrates steps of a method which could be performed to accomplish optional steps S1110, S1112 and S1114 in the method illustrated in FIG. 11.

The method 1300 begins and proceeds to step S1302 where a request to be connected to a conference call is received from an individual. The method then proceeds to step S1304, where a location of the individual is determined. The location of the individual could be determined in multiple different ways. In some embodiments, a telephony device used by the individual could report its own position, and the location of the individual could be assumed to be immediately adjacent to that telephony device. For example, a GPS unit of the telephony device could report GPS latitude and longitude coordinates for the telephony device, and the individual would be assumed to be located immediately adjacent to that location. In other embodiments, the individual may simply be queried as to which device he wishes to use for a call. This could involve receiving from the individual an identifier for a pre-configured device, or an identifier, such as a telephone number, of an endpoint device. In alternate embodiments, the location of the individual could be determined in different ways.

The method then proceeds to step S1306 where the identity or telephone numbers for one or more telephony devices that are located near the individual are determined. For example, if the individual is determined to be located within a conference room, step S1306 could involve determining the identity or telephone number of a telephony device within the conference room. A database of telephony device locations could be consulted in order to make the determination in step S1306.

In some embodiments, the method would then proceed directly to step S1312, where the determined telephony device is connected to the conference call using methods like those described above. In alternate embodiments, the method could include optional step S1308, where a query is sent to the individual asking whether the individual would like the conference call to be connected to one of the telephony devices which is determined to be near the individual's location. This optional step might be performed if step S1306 determines that there are multiple telephony devices located near the individual. In that case, the query sent in step S1308 could identify all those telephony devices, and ask the user to select one of the telephony devices for connection to the conference call. The user's response to the query sent in step S1308 is then interpreted in optional step S1310. The method then proceeds to step S1312 where a communications channel is setup between the conference call and the telephony device identified by the individual.

Figure 14:
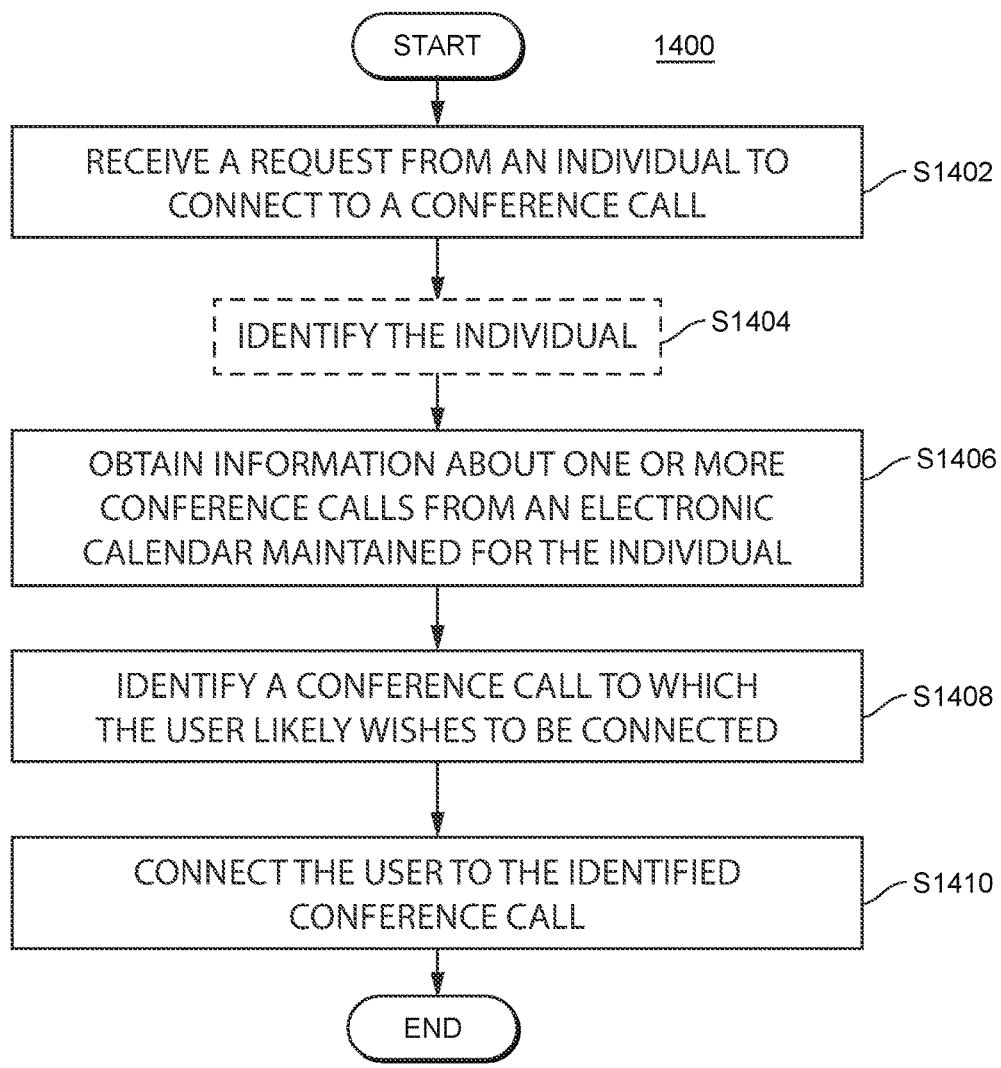
FIG. 14 is a flow diagram illustrating steps of another method of automatically connecting an individual to a conference call.

FIG. 14 illustrates steps of a method that could be performed to receive a request from an individual to be connected to a conference call, and to then provide the connection. The method 1400 would begin and proceed to step S1402 where a request from an individual to be connected to a conference call is received. In some embodiments, that request could be received by a voice interface 140, such as the one illustrated in FIG. 5. For example, the request could be a spoken request which is initially received via a microphone 512 of the voice interface 140. The microphone would provide the user's spoken input to a speech interpretation unit 506 of the user interaction unit 502. The speech interpretation unit 506 would then interpret the user's spoken request to be connected to a conference call.

In some embodiments, the identity of the individual making the request would be known. In other instances, the identity of the individual making the request might not be known. If the identity of the individual is not known, the method illustrated in FIG. 14 would proceed to optional step S1404, where the individual who made the spoken request is identified. The identification of the individual could be performed utilizing voice recognition techniques by the user interaction unit 502. Once the individual has been identified, information from the identified individual's electronic calendar is used to perform the remaining steps of the method.

The method then proceeds to step S1406, where information about one or more conference calls are obtained from the individual's electronic calendar. Information about conference calls on the individual's electronic calendar could be obtained using any of the methods discussed above.

The method then proceeds to step S1408, where a conference call that the user likely wishes to be connected to is identified. If the information obtained in step S1406 indicates that there is only a single conference call scheduled for the individual in the near future, that conference call would be identified as the one to which the user likely wishes to be connected. If multiple conference calls are scheduled for the individual with start times that are near to the current time, the identification of the conference call to which the user likely wishes to be connected could be based upon the one having the nearest start time. Of course, in come embodiments, the user would actually identify the conference call to which he wishes to be connected as part of the initial request, or in response to a query posed to the user. In that case, it would be much easier for the system to determine the identity of the conference call to which the user wishes to be connected.

The method then proceeds to step S1410, where the individual is connected to the identified conference call. This could be performed using any of the techniques discussed above.

Figure 15:
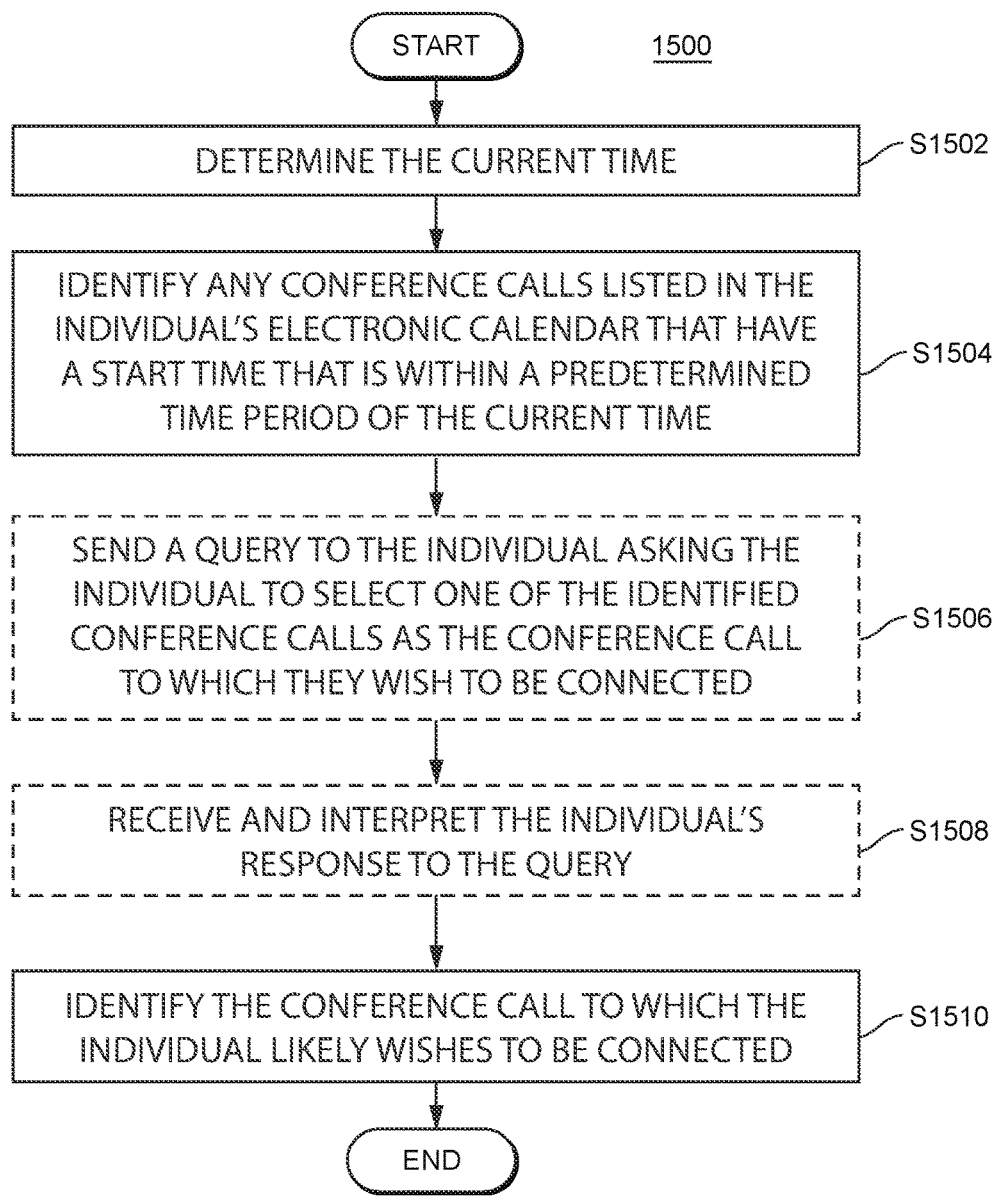
FIG. 15 is a flow diagram illustrating steps of a method of determining to which conference call an individual likely wishes to be connected.

In step S1408 of the method illustrated in FIG. 14, it is necessary to identify one conference call to which the user likely wishes to be connected. That step could be performed utilizing the method illustrated in FIG. 15. In the method illustrated in FIG. 15, the method 1500 begins and proceeds to step S1502, where the current time is determined. The method then proceeds to step S1504, where any conference calls listed in the individual's electronic calendar that have a start time that is within a predetermined time period of the current time are identified. As noted above, if only a single conference call has a start time that is near to the current time, that conference call would be identified as the one to which the user likely wishes to be connected. However, if the result of step S1504 is that there are several conference calls with a start time near to the current time, the method would proceed to optional step S1506, where a query is sent to the individual asking the individual to select one of the identified conference calls as the conference call to which the individual wishes to be connected. The method would then proceed to optional step S1508, where the individual's response to that query would be received and interpreted. The method then proceeds to step S1510, where one of the conference calls is identified as the one the user likely wishes to be connected to.

In some embodiments, a decision about which conference call a user likely wishes to be connected to may also be based on whether or not the user affirmatively accepted a conference call invitation. Also, if a user is marked as an optional participant on a first conference call and as a required participant on a second conference call, these facts may also be taken into account when deciding whether to connect the user to the first or second conference call. Moreover, a conference connection unit 302 may observe user behavior over time and use information gained from those observations to predict which of multiple conference calls a user wishes to connect to.

In some embodiments, the conference connection unit 302 may be configured to identify when a user has conflicting or overlapping conferences listed in one or more electronic calendars. In some instances, this could be two conference calls scheduled for the same or overlapping times. In other instances, this could be conference calls listed in two or more different electronic calendars that are being maintained for the user which are scheduled for the same or overlapping times. When the conference connection unit identifies such instances, the conference connection unit 302 may proactively notify the user of the scheduling conflict in advance of the scheduled conference calls so that the user can take action to resolve the scheduling conflict. Such notifications could be sent to the user via email, SMS or MMS messages, via a recording delivered to the user via the user's telephony device, or possibly via a voice interface 140 that is available to the user.

Some of the foregoing descriptions discussed the invention in terms of an audio conference call. In alternate embodiments of the invention, the claimed systems and methods could be used to automatically connect an individual to a video conference. In such alternate embodiments, instead of placing an outgoing telephone call to a conference call bridge, the system could establish a communications channel to a video conference calling system. Thus, any references in the foregoing description and the following claims to an access telephone number are to be interpreted as also encompassing an access Internet IP address and/or an access Internet URL. Likewise, any references to a conference call are to be interpreted as encompassing both audio and video conference calls. Any references to establishing a communications channel are to be interpreted as encompassing establishing an audio communications channel via one or more telephony systems, as well as establishing a video communications channel via telephony and/or computer or data networks.

In many of the foregoing methods, an individual is connected to a conference call by setting up a first communications channel from a telephony system to the conference call system, by setting up a second communications channel between the telephony system and the individual's telephony device, and by then bridging together the two communications channels. The first and second communications channels could be two telephone calls. Typically, this would mean that the telephony system generates first and second call detail records (CDRs) for both calls. However, because both calls were used to connect the individual to the conference call, the telephony system might generate only a single consolidated CDR that reflects the charges to be applied to the individual's account for setting up the connection between the conference call and the user's telephony device.

In some embodiments, the conference connection unit as illustrated in FIG. 3 might also include a transcription and action item generation unit 319. The transcription and action item generation unit 319 could generate a textual transcription of a conference call to which an individual was connected, and that transcription could then be provided to the individual, and possibly to other participants on the conference call. The transcription and action item generation unit might also automatically generate action items for individuals that participated in a conference call, and information about those action items could be sent to the individuals or participants. The action items would be generated based on statements made during the conference call.

In some of the embodiments discussed above, a notification about an upcoming conference call is provided to an individual. Such a notification might be provided by playing an audio message to the individual. That audio message could be played to the individual by the individual's telephony device, or by a voice interface 140. Likewise, the voice interface could be used to connect the user to the conference call, instead of a traditional telephony device.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the invention should in no way be considered limiting. Systems and methods embodying the invention could also be implemented as part of an alternate type of telephony system.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for connecting a telephony device to a conference call, comprising:
   obtaining, using one or more processors, information about the conference call listed in an individual's electronic calendar, wherein the information includes at least a start time of the conference call;
   determining a location of the individual;
   identifying a telephony device located in close proximity to the individual; and
   sending a query to the individual that asks the individual whether the individual would like to use the identified telephony device to participate in the conference call;
   receiving and interpreting input from the individual that is provided in response to the query; and
   setting up a communications channel between the conference call and the identified telephony device so that the individual can use the identified telephony device to participate in the conference call when the input received from the individual indicates that the individual would like to use the identified telephony device to participate in the conference call.

2. The method of claim 1, wherein sending a query comprises causing the query to be played to the individual by a voice interface.

3. The method of claim 1, wherein sending a query further comprises sending a query that asks the individual to identify an alternate telephony device or to provide an identifier of an alternate device that the individual would like to use to participate in the conference call if the individual does not wish to use the identified telephony device to paricitpate in the conference call, and wherein the method further comprises setting up a communications channel between the conference call and the alternate telephony device or alternate device so that the individual can use the alternate telephony device or alternate device to participate in the conference call when the input received from the individual indicates that the individual would like to use the alternate telephony device or alternate device to participate in the conference call.

4. The method of claim 1, wherein determining a location of the individual comprises receiving location information from a telephony device used by the individual.

5. The method of claim 1, wherein setting up a communications channel between the conference call and the identified telephony device comprises:
   setting up a first communications channel between a telephony system and a conference call bridge for the conference call;
   setting up a second communications channel between the telephony system and the identified telephony device; and
   bridging together the first and second communications channels to create the communications channel between the conference call and the identified telephony device.

6. The method of claim 5, wherein the timing of the performance of the bridging step is such that if the conference call bridge plays a query asking the individual to speak their name, that query will play after the bridging step has been performed.

7. A system for connecting a telephony device to a conference call, comprising:
   means for obtaining information about the conference call listed in an individual's electronic calendar, wherein the information includes at least a start time of the conference call;
   means for determining a location of the individual;
   means for identifying a telephony device located in close proximity to the individual;
   means for sending a query to the individual that asks the individual whether the individual would like to use the identified telephony device to participate in the conference call;

means for receiving and interpreting input from the individual that is provided in response to the query; and means for setting up a communications channel between the conference call and the identified telephony device so that the individual can use the identified telephony device to participate in the conference call when the input received from the individual indicates that the individual would like to use the identified telephony device to participate in the conference call.

8. A system for connecting a telephony device to a conference call, comprising:

an electronic calendar interface comprising at least one processor that obtains information about the conference call listed in an individual's electronic calendar, wherein the information includes at least a start time of the conference call; and a communication channel setup unit comprising at least one processor that:
determines a location of the individual;
identifies a telephony device located in close proximity to the individual;
sends a query to the individual that asks the individual whether the individual would like to use the identified telephony device to participate in the conference call;
receives and interprets input from the individual that is provided in response to the query; and
sets up a communications channel between the conference call and the identified telephony device so that the individual can use the identified telephony device to participate in the conference call when the input received from the individual indicates that the individual would like to use the identified telephony device to participate in the conference call.

9. The system of claim 8, wherein the communication channel setup unit sends a query to the individual by causing the query to be played to the individual by a voice interface.

10. The system of claim 8, wherein the query sent to the individual by the communication channel setup unit also asks the individual to identify an alternate telephony device or to provide an identifier of an alternate device that the individual would like to use to participate in the conference call if the individual does not wish to use the identified telephony device to participate in the conference call, and wherein the communication channel setup unit sets up a communications channel between the conference call and the alternate telephony device or alternate device so that the individual can use the alternate telephony device or alternate device to participate in the conference call when the input received from the individual indicates that the individual would like to use the alternate telephony device or alternate device to an participate in the conference call.

11. The system of claim 8, wherein the communication setup unit determines a location of the individual based on location information received from a telephony device used by the individual.

12. The system of claim 8, wherein the communication channel setup unit sets up a first communications channel between a telephony system and a conference call bridge for the conference call, sets up a second communications channel between the telephony system and the identified telephony device, and then bridges together the first and second communications channels to create the communications channel between the conference call and the identified telephony device.

13. The system of claim 12, wherein the timing of the performance of the bridging step is such that if the conference call bridge plays a query asking the individual to speak their name, that query will play after the bridging step has been performed.

14. A method for connecting a telephony device to a conference call, comprising:

obtaining, using one or more processors, information about the conference call listed in an individual's electronic calendar, wherein the information includes at least a start time of the conference call;
determining a location of the individual;
generating a list of at least two telephony devices that are located in close proximity to the individual and that the individual may wish to use to participate in the conference call;
causing a query to be displayed or played to the individual, the query asking which of the telephony devices on the generated list the individual would like to use to participate in the conference call;
receiving and interpreting input from the individual that is provided in response to the query to determine which of the telephony devices on the generated list the individual selected to use to participate in the conference call; and
setting up a communications channel between the conference call and the telephony device selected by the individual so that the individual can use the selected telephony device to participate in the conference call.

15. The method of claim 14, wherein determining a location of the individual comprises receiving location information from a telephony device used by the individual.

16. A system for connecting a telephony device to a conference call, comprising:

an electronic calendar interface comprising at least one processor that obtains information about the conference call listed in an individual's electronic calendar, wherein the information includes at least a start time of the conference call; and a communication channel setup unit comprising at least one processor that:
determines a location of the individual;
generates a list of at least two telephony devices that are located in close proximity to the individual and that the individual may wish to use to participate in the conference call;
causes a query to be displayed or played to the individual, the query asking which of the telephony devices on the generated list the individual would like to use to participate in the conference call;
receives and interprets input from the individual that is provided in response to the query to determine which of the telephony devices on the generated list the individual selected to use to participate in the conference call; and
sets up a communications channel between the conference call and the telephony device selected by the individual so that the individual can use the selected telephony device to participate in the conference call.

17. The system of claim 16, wherein the communication channel setup unit determines a location of the individual using location information that is received from a telephony device used by the individual.

* * * * *